(12) United States Patent
Schierling et al.

(10) Patent No.: US 11,101,642 B2
(45) Date of Patent: Aug. 24, 2021

(54) METHOD FOR OPERATING A POWER DISTRIBUTING APPARATUS, AND POWER DISTRIBUTING APPARATUS

(71) Applicant: SIEMENS AKTIENGESELLSCHAFT, Munich (DE)

(72) Inventors: Hubert Schierling, Erlangen (DE); Benno Weis, Hemhofen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/495,926

(22) PCT Filed: Mar. 13, 2018

(86) PCT No.: PCT/EP2018/056177
§ 371 (c)(1),
(2) Date: Sep. 20, 2019

(87) PCT Pub. No.: WO2018/172135
PCT Pub. Date: Sep. 27, 2018

(65) Prior Publication Data
US 2020/0136375 A1  Apr. 30, 2020

(30) Foreign Application Priority Data
Mar. 23, 2017  (EP) .................................... 17162579

(51) Int. Cl.
*H02H 7/26* (2006.01)
*H02J 1/00* (2006.01)

(52) U.S. Cl.
CPC ................. *H02H 7/26* (2013.01); *H02J 1/00* (2013.01)

(58) Field of Classification Search
CPC ...... H01H 55/00; H01H 47/223; H01H 9/541; H01H 83/04; H02H 7/222; H02H 7/262;
(Continued)

(56) References Cited

U.S. PATENT DOCUMENTS 5,905,615 A * 5/1999 Rivetti ..................... H02H 7/30
361/63
2003/0202394 A1 10/2003 Canova et al.
(Continued)

FOREIGN PATENT DOCUMENTS

CN 104124661 A 10/2014
DE 69717585 T2 11/2003
(Continued)

OTHER PUBLICATIONS

PCT International Preliminary Examination Report and Written Opinion of International Examination Authority dated Apr. 11, 2019 corresponding to PCT International Application No. PCT/EP2018/056177 filed Mar. 13, 2018.

*Primary Examiner* — Bryan R Perez
(74) *Attorney, Agent, or Firm* — Henry M. Feiereisen LLC

(57) ABSTRACT

A power distributing apparatus connecting several loads to a DC voltage supply includes a number of cascaded hierarchy stages connected between the DC voltage supply and the loads. The hierarchy stages define a radial-network-type current path which branches into a number of parallel sub-paths with each additional hierarchy stage. The number of sub-paths connecting the loads corresponds to the number of connected loads. Each sub-path conducts an electric current which can be switched by a respective circuit breaker disposed in each sub-path. The value of a trigger current for each circuit breaker in each hierarchy stage increases successively from the load side toward the DC voltage supply side.

10 Claims, 2 Drawing Sheets

(58) Field of Classification Search
CPC ............ H02H 7/261; H02H 7/30; H02H 7/26; H02H 3/006; H02H 3/08; H02H 1/0007
See application file for complete search history.

(56) References Cited

U.S. PATENT DOCUMENTS

2014/0319929 A1  10/2014  Chen et al.
2015/0270704 A1* 9/2015  Qi ............................ H02H 7/28
                                                                  361/63

FOREIGN PATENT DOCUMENTS

| DE | 60119102 T2 | 9/2006 |
| DE | 102008025534 A1 | 12/2009 |
| EP | 0661189 A1 | 7/1995 |
| EP | 1564077 A1 | 8/2005 |
| EP | 3107171 A1 | 12/2016 |
| WO | WO 2004082091 A1 | 9/2004 |

* cited by examiner

METHOD FOR OPERATING A POWER DISTRIBUTING APPARATUS, AND POWER DISTRIBUTING APPARATUS

This application is the U.S. National Stage of international Application No. PCT/EP2018/056177, filed Mar. 13, 2018, which designated the United States and has been published as International Publication No. WO 2018/172135 A1 and which claims the priority of European Patent Application, Serial No. 17162579.1, filed Mar. 23, 2017, pursuant to 35 U.S.C. 119(a)-(d).

BACKGROUND OF THE INVENTION

The invention relates to a method for operating a power distribution apparatus for the connection of a number of loads to a common DC voltage supply. The invention furthermore relates to a power distribution apparatus which can be operated in accordance with a method of this kind.

In electrical installations, power distribution apparatuses are frequently used to connect a plurality of electrical loads or consumers to a common supply network. Power distribution apparatuses of this kind are frequently implemented as a specific form of a current network or current path, which is defined in the topology by a multiplicity of nodes and meshes.

In this context, a typical implementation of such a power distribution apparatus is what is known as a radial network as a current path, which as a rule has a common or central feed point and distributes the electrical current of the supply network over a plurality of connection lines (subpaths) to the individual consumers or loads.

Here, the radial network typically has a number of hierarchy stages or hierarchy levels connected in a cascading manner between the supply network and the loads. Starting from the supply network side, the current path formed by the hierarchy stages, with each additional hierarchy stage, branches off into a number of parallel subpaths, so that on the load side the hierarchy stage has a number of subpaths for interconnecting the loads which corresponds to the number of loads. In this context, the first, i.e. supply network-side hierarchy stage has a subpath which is coupled on one side to the feed point and on the other side to a node point which branches off into a number of subpaths of a second hierarchy stage. Here, the hierarchy stages are connected one after the other in series, wherein the subpaths of a respective hierarchy stage are each connected to one another in parallel. As a result, a current path is formed which branches off in an approximately tree-like manner to supply the loads.

As a rule, the subpaths of the hierarchy stages have circuit breakers for protecting the connected loads. For an effective operation of a power distribution apparatus of this kind, in the event of a tripping of or a fault in the circuit breakers, what is known as selectivity is important. The term selectivity is to be understood in the following as particularly meaning the case in which, in the event of a (load-side) fault in the power circuit of the circuit breakers connected in series of the hierarchy stages, only the circuit breaker of the subpath is tripped, which is situated immediately before the faulty load or before the fault point.

A selectivity of this kind thus ensures that, in a power distribution apparatus constructed in the manner of a radial network, in spite of a fault, as many loads of the electrical installation as possible remain in operation, and that only that circuit breaker immediately before the fault point or the faulty load is tripped.

SUMMARY OF THE INVENTION

In the case of a supply network supplied with a DC voltage or with a direct current (DC voltage supply), the circuit breakers for protecting the loads as a rule are generally implemented as electronic circuit breakers, since fault currents are not readily able to be reliably connected by means of mechanical circuit breakers. The electronic circuit breakers are implemented as semiconductor switches, in particular as IGBTs (insulated gate bipolar transistors), for example. Through this, however, the desired selectivity is disadvantageously influenced during operation of a power distribution apparatus constructed in the manner of a radial network.

For operation of a power distribution apparatus, it is conceivable, for the connection of a number of loads to a common DC voltage supply, to capture the voltage at the IGBTs (forward voltage, collector-emitter voltage) and to compare the captured voltage (the captured voltage value) with a stored threshold value, wherein the respective IGBT is triggered when the threshold value is reached. In this context, the current-limiting behavior (desaturation behavior) of the IGBTs is used in particular. The electrical current conducted by the semiconductor switch, at which the forward voltage reaches the threshold value, in this case depends upon the rated current of the switch and also on the actuation voltage (gate voltage) thereof.

If the tripping criterion of the circuit breaker is dimensioned according to the respective rated current thereof, for example, then as a rule in the event of a fault a circuit breaker of a supply-side hierarchy stage would be tripped at a later point than a circuit breaker of a load-side hierarchy stage, since the rated current of the circuit breaker of the supply-side hierarchy stage is higher, because it conducts the current of all branched-off subpaths of the following hierarchy stage(s). If, however, the rated current of a single (first) load is significantly greater than the rated current of an immediately adjacent (second) load, then there is only a small difference between the rated current of the circuit breaker of the first load and the rated current of a circuit breaker of the higher-level hierarchy stage which supplies the two loads, meaning that there is no selectivity. As a result, the use of circuit breakers of the same kind in such a power distribution apparatus is disadvantageously made difficult in applications with DC voltage supplies, whereby it is necessary to use different circuit breakers for different hierarchy stages, for example.

The invention is based on the object of specifying a particularly suitable method for operating a power distribution apparatus for the connection of a number of loads to a DC voltage supply. In particular, as high a selectivity as possible is to be realized in the event of a fault. The invention is furthermore based on the object of specifying a power distribution apparatus which can be or is operated in accordance with a method of this kind.

According to one aspect of the invention, the object is achieved by a method for operating a power distribution apparatus for the connection of a number of loads to a DC voltage supply, with a number of hierarchy stages which are interconnected between the DC voltage supply and the loads and are connected in a cascading manner one after the other in series.

wherein a current path formed by the heirarchy stages in the manner of a radial network, with each additional heriarchy stage, is branched off into a number of parallel subpaths such that the next-closest hierarchy stage (H2) on the load side has a number of subpaths for interconnecting the loads which corresponds to the number of loads, wherein an electrical current, which is able to be switched by means of a respective circuit breaker, is conducted by each subpath, and wherein a value of a tripping current of the respective circuit breaker is successively increased starting from the load side in the direction of the supply side with each hierarchy stage.

According to another aspect of the invention, the object is achieved by a power distribution apparatus 11 for performing the method as set forth above, with a number of controllable circuit breakers in subpaths of a current path in the manner of a radial network.

Advantageous embodiments and developments are the subject matter of the respective dependent claims.

The method according to the invention is suitable and embodied for operating a power distribution apparatus for the connection of a number of loads to a DC voltage supply. Interconnected between the DC voltage supply and the loads (consumers) is a number of hierarchy stages connected in a cascading manner one after the other. In this context, the hierarchy stages are particularly connected in series with one another between a central or common feed point of the DC voltage supply (supply side) and the loads (load side).

In the interconnection state, the hierarchy stages form a current path in the manner of a radial network for the distribution of the electrical (DC) current of the DC voltage supply to the individual loads. Here, with each additional hierarchy stage, the current path branches off into a number of parallel subpaths. The tree-like branching-off takes place here in such a manner that the next-closest hierarchy stage on the load side has a number of subpaths (branch, current branch) for interconnecting the loads which corresponds to the number of loads. In other words, the subpaths of a hierarchy stage are connected in parallel with one another.

Suitably, a respective circuit breaker is interconnected in each of the subpaths of the current path. Using the circuit breaker, which in particular is implemented as an electronic circuit breaker, preferably as a (power) semiconductor switch, the electrical (partial) current conducted in the subpaths is able to be switched, in particular in a controlled manner. The circuit breakers serve to protect the connected loads in the event of an overcurrent, which is also referred to as a fault current in the following, i.e. an electrical current with such a high current value that damage would occur to one or each load in the case of a sustained exposure.

In this context, the circuit breakers trip or open the respective subpath if the conducted current leads to a forward voltage (collector-emitter voltage), which reaches or exceeds a respective threshold value. The current which leads to said threshold value being exceeded is also referred to as a tripping current in the following. The tripping current or the threshold value is preferably dimensioned differently for the different hierarchy stages. According to the method, provision is made in this case for the value of the tripping current of the respective circuit breaker to be successively increased from the load side in the direction of the supply side with each hierarchy stage.

A particularly suitable method for operating a power distribution apparatus is realized as a result. In particular, in the event of a fault, as high a selectivity as possible is thus enabled in a simple manner. Thus, circuit breakers of load-side hierarchy stages, or subpaths with a lower tripping current, are tripped in particular as the circuit breakers on the supply side. A particularly expedient current selectivity is realized as a result, meaning that it is ensured in particular that only the circuit breaker situated in the current path immediately before a fault point or fault load is tripped. This guarantees that, in spite of a fault, as many loads as possible remain in operation, which translates advantageously to the operation thereof, particularly in applications in electrical installations or machines.

In a suitable development, the value of the tripping current is set on the basis of a respective actuation voltage of the allocated circuit breaker. Preferably, in this context the circuit breakers of different hierarchy stages are implemented as the same kind of IGBTs, which in each case are able to be controlled by means of a gate voltage as actuation voltage. As a result, a suitable setting of the respective tripping current is made possible on the basis of the desaturation behavior of IGBTs of this kind in a technically simple manner.

This means that during operation of the circuit breaker, not only the respective rated current in a circuit breaker is determined, but also the level of the respective actuation voltage. In contrast to the prior art, in fact, the hierarchy level, i.e. the position of the respective hierarchy stage in the current path, is thus additionally taken into consideration for setting the tripping current.

In a possible development, for each hierarchy level, i.e. with each additional hierarchy stage or branching-off of the current path, the actuation voltage is increased or raised by a certain voltage value. If, for example, the rated currents of two circuit breakers of two series-connected subpaths of successive hierarchy stages are identical, then the circuit breaker in the bad-side subpath is actuated with a lower actuation voltage, for example 15 V (volts), and the circuit breaker in the supply-side subpath is actuated with an actuation voltage which is higher by comparison, for example 15.5 V. Thus, in the event of a fault, the load-side circuit breaker desaturates earlier than the supply-side circuit breaker. As a result, the supply-side circuit breaker is not tripped, whereby the subpaths of the respective hierarchy stage which are connected in parallel with the load-side subpath remain in operation.

Each circuit breaker is preferably implemented as an antiserial circuit of two semiconductor switches, for example in the form of two IGBTs with a freewheel diode connected in antiparallel in each case, wherein one semiconductor switch conducts the current in the direction of the load and the second semiconductor switch conducts the current in the direction of the supply network. In an expedient development, according to the invention the actuation voltage at the semiconductor switch of the circuit breaker, which conducts the current in the direction of the load, is set to be lower (for example at 14.5 V) than the actuation voltage of the second semiconductor switch of the circuit breaker, which conducts the current in the direction of the supply network (for example at 15 V). This achieves that in the event of a fault, in which for example even non-faulty, adjacent capacitive loads, such as e.g. an intermediate circuit capacitor, contribute to the fault current, only the circuit breaker immediately before the fault point is tripped, and not the circuit breaker adjacent thereto at the capacitive load.

In an advantageous embodiment, the or each actuation voltage is set on the basis of an actual current conducted by the respective circuit breaker. In other words, the selectivity in the event of a fault is achieved by the actuation voltage at the circuit breakers being set as a function of how high the current conducted under normal operating conditions is in the respective circuit breaker at the respective point in time (actual current).

In a suitable embodiment, the actuation voltage of the circuit breaker is regulated such that a respective forward voltage, i.e. the collector-emitter voltage in the case of an IGBT as circuit breaker, assumes a fixed setpoint value. In this context, the regulation preferably takes place on a time scale which is slower compared to a slew rate of a short-circuit current, this means for example with a reset time of more than 10 µs, in particular more than 100 µs.

In an alternative embodiment, the or each actuation voltage is set on the basis of a setpoint value for a forward voltage desired for the respective circuit breaker. As a result, a suitable selectivity of the power distribution apparatus is enabled in the event of a fault.

In a conceivable embodiment, in this context the actuation voltage is increased if the respective forward voltage exceeds the setpoint value. Moreover, the actuation voltage is reduced if the forward voltage falls below the setpoint value.

In a suitable embodiment, the or each actuation voltage is set or limited to a respective minimum value if the forward voltage falls below or does not reach the setpoint value. As a result, a secure operation of the power distribution apparatus is also ensured in a current-free state of a subpath.

Furthermore, the or each actuation voltage is additionally or alternatively limited to a respective maximum value if the forward voltage reaches or exceeds the setpoint value. In other words, a maximum value is predetermined, which is not exceeded even in the case of the forward voltage being exceeded by the setpoint value. As a result, a limiting of the fault current to a defined value is realized.

In one possible embodiment, the or each forward voltage is compared with a stored threshold value. In this context, the threshold value is, for example, the voltage value which is anticipated at a maximum permissible (operating) current at a maximum actuation voltage.

In one conceivable development, the or each actuation voltage is reduced on the basis of a stored characteristic curve if the forward voltage reaches or exceeds the threshold value. In particular, in one expedient embodiment, the progression of the or each characteristic curve is varied here for different hierarchy stages. Preferably, the characteristic curves for load-side hierarchy stages have a more rapid voltage drop than for supply-side hierarchy stages.

In other words, the characteristic curves have a progression which drops in a more pronounced manner for hierarchy stages on the load side compared to hierarchy stages on the supply side. In this context, the end point of a characteristic curve at a maximum forward voltage, depending on the hierarchy stage, preferably lies above, for example 2 V above, a threshold voltage of the respective circuit breaker or IGBT, for example 6 V. As a result, an expedient shutdown behavior is realized as a function of the hierarchy stage in relation to the respective tripping currents and short-circuit currents.

An additional or alternative aspect of the method provides that each hierarchy stage has a different threshold value, wherein the value of the respective threshold value is increased in the direction of the loads with each subsequent hierarchy stage, in particular, in one advantageous embodiment provision is made for the difference between the setpoint value and the threshold value to be predetermined as substantially identical for each hierarchy stage. In other words, the threshold value of the supply-side hierarchy stages has a value which has been scaled down compared to the threshold value of the load-side hierarchy stages.

Alternatively, it is likewise conceivable for the threshold value to be dimensioned the same for each hierarchy stage of the current path.

In one conceivable embodiment, a or each tripping time of the circuit breakers is dimensioned on the basis of the respective actuation voltage. As a result, in addition to the current selectivity, a time selectivity of the power distribution apparatus is realized. The tripping time is the duration for an independent shutdown, i.e. for the tripping, of the circuit breaker in the event of a fault current or short-circuit current.

To this end, for each circuit breaker, a time value is suitably stored in a table, for example, which determines the duration for which the circuit breaker, as a function of its respective actuation voltage, is capable of conducting the fault current or short-circuit current. Here, the tripping time of the circuit breaker is suitably dimensioned to this respective duration. For example, the shutdown of the circuit breaker takes place after a certain percentage, e.g. 80%, of this duration. This achieves that the short-circuit duration or tripping time as a rule is longer than what is conventional in the prior art.

Due to the tripping time which is extended in this way, a sufficient time is made available to a controller (control device) which is at a higher level than the circuit breakers, in order to ascertain, on the basis of the feedback signals delivered by all the circuit breakers, a desaturation state at the fault location or the fault point, and to open only the circuit breaker situated immediately before in a targeted manner. Thus, only the circuit breaker which has to be opened to control the fault is opened in a targeted manner.

The power distribution apparatus according to the invention is suitable and configured for performing the method described above. To this end, the power distribution apparatus comprises a number of controllable circuit breakers in subpaths of a current path in the manner of a radial network.

The power distribution apparatus preferably has a controller (i.e. a control device), by means of which the individual circuit breakers are actuated. Additionally or alternatively, each circuit breaker is implemented with an integrated controller.

In this context, the controller is generally configured—in terms of programming and/or circuit technology—for performing the method according to the invention described above. The controller is thus in particular configured to set the tripping current of the circuit breakers as a function of the respective hierarchy stages.

The controller is formed at least in essence by a microcontroller with a processor and a data memory, in which the functionality for performing the method according to the invention is implemented in terms of programming technology in the form of operating software (firmware) such that the method—possibly in interaction with a user—is performed automatically when the operating software is executed in the microcontroller.

In one possible embodiment as part of the invention, the controllers are alternatively, however, also formed by programmable electronic components, for example an application-specific integrated circuit (ASIC), in which the functionality for performing the method according to the invention is implemented by means of circuitry.

BRIEF DESCRIPTION OF THE DRAWING

Exemplary embodiments of the invention will now be explained hi more detail, making reference to a drawing, in which, in simplified and schematic representations.

DETAILED DESCRIPTION OF PREFERRED EMBODIMENTS

Figure 1:
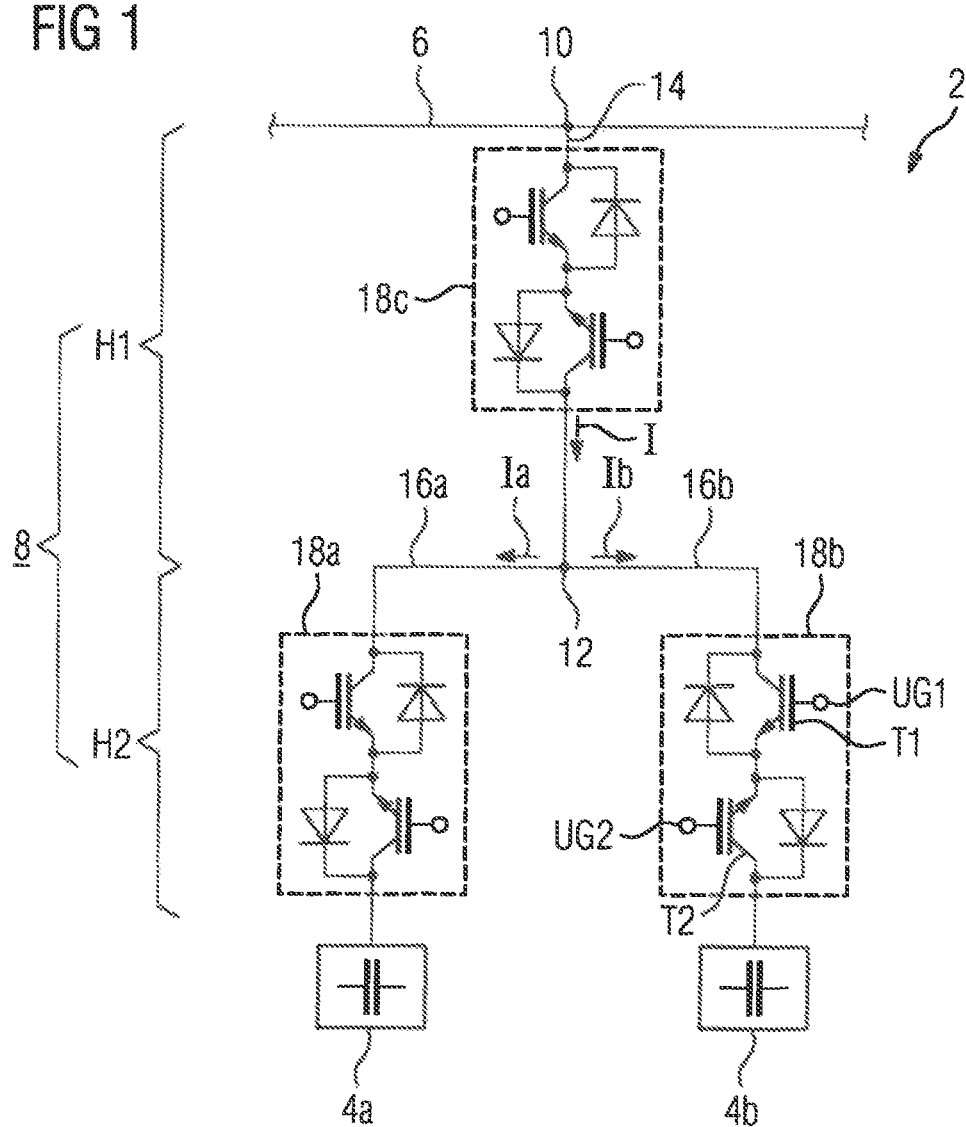
FIG. 1 shows an extract of a power distribution apparatus hi a block diagram.

Corresponding parts and variables are always marked with the same reference characters in all figures.

FIG. 1 shows a power distribution apparatus 2 for the connection of two loads or consumers 4a and 4b to a common DC voltage network or a DC voltage supply 6. By means of the power distribution apparatus 2, an electrical (direct) current I of the DC voltage supply 6 is distributed over the two connected loads 4a and 4b.

In the exemplary embodiment shown in FIG. 1, the connected loads 4a and 4b each have capacitive components, such as a respective intermediate circuit capacitor for example.

The power distribution apparatus 2 has a current path 8, which is interconnected between a common or central feed point 10 of the DC voltage supply 6 and the loads 4a and 4b. The current path 8, which branches off in a tree-like manner, here has two hierarchy stages H1 and H2, which are connected in a cascading manner one after the other in series. The hierarchy stage H1 is arranged on the supply side and is thus interconnected between the feed point 10 and a node point 12. The load-side hierarchy stage H2, arranged opposite the supply side, is interconnected on one hand to the node point 12 and on the other hand to the loads 4a and 4b.

In the interconnection state of the power distribution apparatus 2 shown in FIG. 1, the hierarchy stages H1 and H2 form the current path 8 in the manner of a radial network for distributing the current I of the DC voltage supply 6 to the individual loads 4a and 4b. In this context, the hierarchy stage H1 has a subpath 14 as a part or section of the current path 8. At the node point 12, the current path 8 branches off at the second hierarchy stage H2 into two parallel subpaths 16a and 16b, which are conducted to the loads 4a and 4b, respectively. Thus, at the node point 12 the (total) current I is divided into a (partial) current Ia conducted to the load 4a and into a (partial) current Ib conducted to the load 4b.

The power distribution apparatus 2 has three electronic circuit breakers 18a, 18b and 18c, which are interconnected in the hierarchy stages H1 and H2 to protect the loads 4a and 4b in the event of a fault current. Interconnected in the subpath 14 of the hierarchy stage H1 is the circuit breaker 18c. In this context, the subpath 16a has the circuit breaker 18a and the subpath 16b accordingly has the circuit breaker 18b. Here, the circuit breakers 18a, 18b, 18c are preferably implemented with identical construction and each have two semiconductor switches T1 and T2 connected in series and in opposite directions to one another, in particular in the form of two IGBTs with identical construction. By way of example, only the semiconductor switches T1, T2 of the circuit breaker 18b are provided with reference characters in FIG. 1.

The semiconductor switches T1, T2 of the circuit breakers 18a, 18b, 18c are controlled via their respective gate connection (control input) by means of a respective gate voltage or actuation voltage UG1 or UG2.

The actuation voltages UG1, UG2 of the semiconductor switches T1, T2 of the circuit breakers 18a, 18b, 18c are set, during operation of the power distribution apparatus 2, such that a selective shutdown or tripping of the circuit breakers 18a, 18b, 18c is made possible in the event of a fault. In particular, in one possible embodiment, the IGBTs T1, T2 of a single circuit breaker 18a, 18b, 18c preferably each have a substantially identical voltage value of the actuation voltage UG. The desaturation behavior of the IGBTs T1, T2 shown schematically in FIG. 2 is used here.

Figure 2:
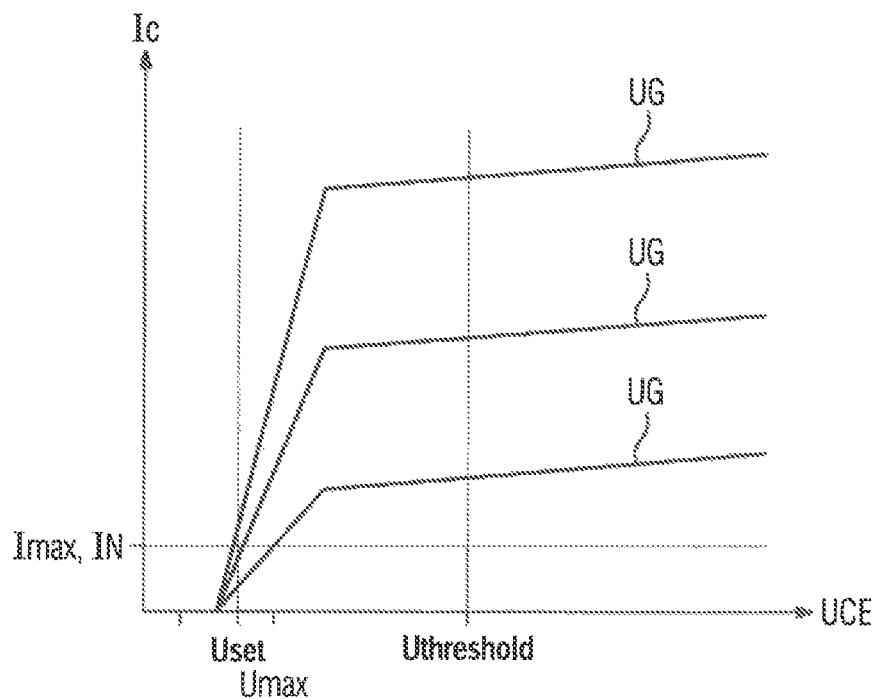
FIG. 2 shows an output characteristic map of an IGBT.

FIG. 2 shows, in a simplified representation, an exemplary output characteristic map of the IGBTs T1, T2, i.e. the first quadrants of a corresponding transistor characteristic map.

Plotted along the horizontal axis of abscissae (x-axis) is a collector-emitter voltage or forward voltage UCE. A load current or collector current IC conducted by the IGBT T1, T2 is plotted along the vertical axis of ordinates (y-axis). The collector current IC substantially corresponds to the conducted actual current of the respective circuit breaker 18a, 18b, 18c. In the case of circuit breaker 18c, the collector current IC here corresponds to the current I, and in the case of circuit breakers 18a and 18b, to the currents Ia and Ib, respectively.

A rated current IN of the IGBTs T1 and T2 is represented as lines oriented in parallel with the axis of abscissae. A setpoint voltage Uset which is desired during operation is shown as a vertically oriented line. In parallel with said line, a line is shown as a threshold value voltage or as a (voltage) threshold value Uthreshold.

As can be seen relatively clearly in FIG. 2, a current, in which the forward voltage UCE reaches the threshold value Uthreshold, depends upon the rated current IN of the circuit breaker 18a, 18b, 18c and also on the actuation voltage UG of the IGBTs T1 and T2.

To ensure as high a selectivity as possible in the event of a fault, the power distribution apparatus 2 is operated using a method according to the invention. According to the method, provision is made here for a value of a tripping current of the respective circuit breaker 18a, 18b, 18c, i.e. the value of the conducted current, at which the circuit breaker 18a, 18b, 18c is tripped or the IGBTs T1, T2 are opened, to be successively increased starting from the load side in the direction of the supply side with each hierarchy stage H1 and H2. This means that the circuit breaker 18c of the supply-side hierarchy stage H1 has a higher tripping current than the circuit breakers 18a and 18b of the load-side hierarchy stage H2. To this end, in particular the actuation voltages UG for operating the IGBTs T1, T2 for the circuit breaker 18c and the circuit breakers 18a and 18b are set differently, so that the circuit breakers 18a and 18b are tripped at a lower current value than the circuit breaker 18c.

For this purpose, the respective actuation voltage UG as set as a function of the respective rated current IN and also the hierarchy stage H1 and H2.

In one possible exemplary embodiment of the method, the rated currents IN of the circuit breakers 18c and 18a are substantially identical. In this context, the IGBTs T1, T2 of the circuit breakers 18a and 18b are actuated with an actuation voltage UG of 15 V. The actuation voltage UG of the IGBTs T1, T2 of the circuit breaker 18c has a voltage value, which is increased by comparison, of 15.5 V for example. If, in this embodiment, a fault occurs at the load 4a, then the IGBTs T1, T2 of the circuit breaker 18a desaturate earlier than the IGBTs T1, T2 of the circuit breaker 18c, as a result of the lower actuation voltage UG, As a result, in the event of a fault of this kind, the circuit breaker 18a is tripped, whereby the load 4b secured by the circuit breaker 18b remains in operation.

In an alternative exemplary embodiment of the method, the selectivity is achieved by the actuation voltage UG of the circuit breakers 18a, 18b, 18c being set as a function of the actual current IC conducted under normal operating conditions in each case. In particular, the actuation voltage UG is set here in each case such that the respective forward voltage UCE is regulated to the setpoint voltage Uset. In this context, the regulation suitably takes place on a time scale which is slower compared to a slew rate of a short-circuit current. In a preferred embodiment, the setpoint voltage Uset for the load-side circuit breakers 18a and 18b is chosen to be higher than for the supply-side circuit breaker 18c.

In a second embodiment, the actuation voltage UG2 of the IGBTs T2 of the respective circuit breakers 18a, 18b, 18c is set to a higher voltage value than the actuation voltage UG1 of the associated IGBTs T1. This causes the circuit breaker 18a to be tripped earlier than the circuit breaker 18b in the event of a fault in the load 4a for example, in which the intermediate circuit capacitor of the load 4b also feeds at the fault point.

A further exemplary embodiment for ensuring as high a selectivity as possible during operation of the power distribution apparatus 2 is explained in greater detail below on the basis of FIG. 3.

Figure 3:
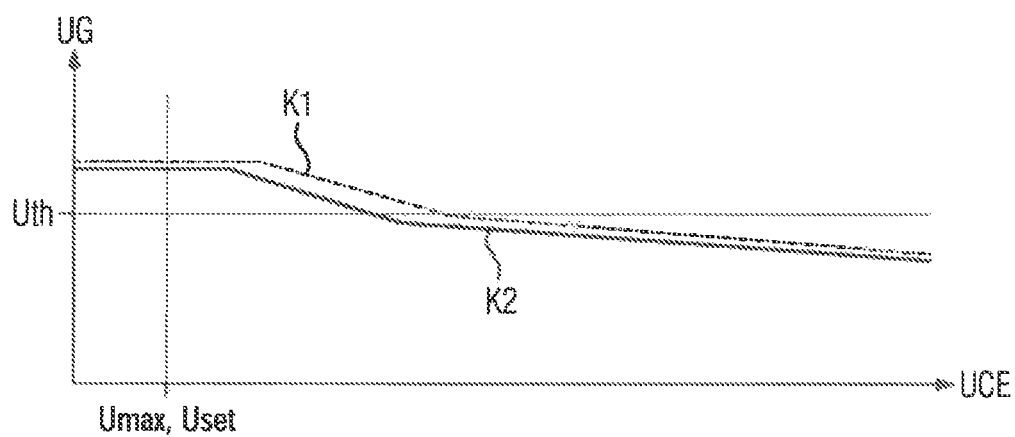
FIG. 3 shows a forward voltage/actuation voltage diagram with two characteristic curves for the reduction of the actuation voltage in the event of a fault in the power distribution apparatus.

FIG. 3 shows, in a schematic and simplified representation, a forward voltage/actuation voltage diagram (UCE/UG diagram). Here, the horizontal axis of abscissae (x-axis) indicates the forward voltage UCE of the IGBTs T1, T2. The actuation voltage UG of the IGBTs T1, T2 is plotted along the vertical axis of ordinates (y-axis). A rated voltage Umax occurring during operation at a maximum current Imax is shown as a vertically oriented line. The rated voltage Umax, which is also referred to as maximum voltage, here has a larger voltage value than the setpoint voltage Uset, and substantially corresponds to the forward voltage which occurs at the maximum permissible actuation voltage and maximum permissible operating current Imax.

The selectivity is achieved in this exemplary embodiment of the method by the actuation voltage UG of the circuit breaker 18a, 18b, 18c being set as a function of the respective forward voltage UCE thereof, as long as the forward voltage has a lower voltage value than the maximum voltage Umax. If the forward voltage UCE is greater than a voltage value (Umax) anticipated at a maximum operating current, then the respective actuation voltage UG of the IGBTs T1, T2 concerned is reduced according to a stored characteristic curve. The maximum voltage Umax thus describes a threshold value. Here, different characteristic curves K1 and K2 are preferably provided for each of the hierarchy stages H1 and H2.

Here, the actuation voltage UG of the IGBTs T1 and T2 of the load-side hierarchy stage H2 are set on the basis of the characteristic curve K2 and the actuation voltage UG of the IGBTs T1 and T2 of the supply-side hierarchy stage H1 by means of the characteristic curve K1. In this context, the characteristic curve K2 has a more rapidly dropping progression compared to the characteristic curve K1. The end point of the characteristic curves K1 and K2, at a maximum forward voltage UCE, here preferably lies above, for example 2 V, a threshold voltage Uth of the IGBTs T1, T2, for example 6 V.

In one exemplary embodiment of the method, the circuit breaker 18c of the hierarchy stage H1 and the circuit breakers 18a and 18b of the hierarchy stage H2 have different setpoint voltages Uset, for example. Preferably, the value of the setpoint voltage Uset is smaller here for the circuit breaker 18c of the supply-side hierarchy stage H1 than the value of the setpoint voltage Uset of the circuit breakers 18a and 18b of the load-side hierarchy stage H2.

In an alternative exemplary embodiment of the method, the actuation voltages UG of the IGBTs T1, T2 are set to a respective minimum value if the forward voltage UCE does not reach the setpoint voltage Uset. As a result, a secure operation of the power distribution apparatus 2 is also ensured in a current-free state of a subpath 14, 16a, 16b.

Furthermore, the actuation voltages UG of the IGBTs T1, T2 are limited to a respective maximum value if the forward voltage UCE exceeds the setpoint voltage Uset. In other words, a maximum value for the actuation voltage is predetermined, which is not exceeded even in the case of the forward voltage UCE being exceeded by the setpoint value Uset. As a result, in the event of an occurring fault in a load 4a, 4b, a limiting of the fault current to a defined value is realized.

In a further exemplary embodiment of the method, the tripping times of the circuit breakers 18a, 18b, 18c are dimensioned on the basis of the respective actuation voltage UG. To this end, the duration for which the IGBTs T1, T2, as a function of the actuation voltage UG, are capable of conducting a fault current is stored in a controller (not shown in further detail) as control device or actuation of the IGBTs T1, T2. In a conceivable embodiment, this duration is increased at low actuation voltages UG. In this context, the tripping of the respective circuit breaker 18a, 18b, 18c or the independent shutdown of the IGBTs T1, T2 thereof only takes place once a certain percentage of said duration, for example 80%, has passed since the threshold value Uthreshold has been reached or exceeded by the forward voltage UCE.

By way of this exemplary embodiment, it is achieved that a short-circuit duration of the circuit breakers 18a, 18b, 18c longer than approx. 10 μs (microseconds) is achieved for typical circuit breakers, for example 30 μs. As a result, the controller is provided with enough time to ascertain the fault point in the current path 8 on the basis of feedback signals of the IGBTs T1, T2 by means of the desaturation state thereof, and in a targeted manner to open only the circuit breaker 18a, 18b, 18c which is necessary to safely control the fault.

The invention is not restricted to the exemplary embodiments described above. Rather, other variations can also be derived therefrom by a person skilled in the art without departing from the subject matter of the invention. In particular it is furthermore possible to combine all the individual features described in connection with the exemplary embodiments with one another in a different way also, without departing from the subject matter of the invention.

In particular, it is possible to implement the power distribution apparatus 2 with a plurality of staggered or cascading hierarchy stages, wherein the branching-off or the respective number of parallel subpaths may be different.

What is claimed is:

1. A method for operating a power distribution apparatus, comprising:
   connecting a plurality of loads to a DC voltage supply by way of serially connected cascaded hierarchy stages connected between the DC voltage supply and the plurality of loads and forming a current path, with the current path formed by the hierarchy stages as a radial network that branches with each additional hierarchy stage into a number of parallel sub-paths such that the number of parallel sub-paths of each hierarchy stage closest to a load side corresponds to a number of connected loads;

switching an electrical current conducted in each sub-path with a respective circuit breaker in the sub-path, with each circuit breaker having an actuation voltage set based on an actual current conducted by the circuit breaker and the hierarchy stage; and successively increasing a value of a tripping current of the circuit breakers in each hierarchy stage from the load side toward a supply side, wherein the value of the tripping current is set by a voltage value of the actuation voltage.

2. The method of claim 1, further comprising dimensioning a tripping time of each circuit breaker based on the respective actuation voltage of the respective circuit breaker.

3. A method for operating a power distribution apparatus, comprising:

connecting a plurality of loads to a DC voltage supple by way of serially connected cascaded hierarchy stages connected between the DC voltage supply and the plurality of loads and forming a current path, with the current path formed by the hierarchy stages as a radial network that branches with each additional hierarchy stage into a number of parallel sub-paths such that the number of parallel sub-paths of each hierarchy stage closest to the load side corresponds to a number of connected loads;

switching an electrical current conducted in each sub-path with a respective circuit breaker in the sub-path, with each circuit breaker having an actuation voltage set based on a setpoint value for a forward voltage the circuit breaker;

successively increasing a value of a tripping current of the circuit breakers in each hierarchy from the load side toward a supply side, wherein the value of the tripping current is set by a voltage value of the actuation voltage; and comparing the forward voltage to a stored threshold value.

4. The method of claim 3, further comprising reducing the actuation voltage based on a stored characteristic curve when the forward voltage reaches or exceeds the stored threshold value.

5. The method of claim 4, further comprising varying a course of the stored characteristic curve for different hierarchy stages.

6. The method of claim 3, wherein each hierarchy stage has a different stored threshold value, with the respective different stored threshold value increasing toward the plurality of loads with each subsequent hierarchy stage.

7. The method of claim 3, further comprising dimensioning a tripping time of each circuit breaker based on the respective actuation voltage of the respective circuit breaker.

8. A method for operating a power distribution apparatus, comprising:

connecting a plurality of loads to a DC voltage supply by way of serially connected cascaded hierarchy stages connected between the DC voltage supply and the plurality of loads and forming a current path, with the current path formed by the hierarchy stages as a radial network that branches with each additional hierarchy stage into a number of parallel sub-paths such that the number of parallel sub-paths of each hierarchy stage closest to the load side corresponds to a number of connected loads;

switching an electrical current conducted in each sub-path with a respective circuit breaker in the sub-path, with each circuit breaker having an actuation voltage set based on a setpoint value for a forward voltage the circuit breaker;

successively increasing a value of a tripping current of the circuit breakers in each hierarchy stage from the load side toward a supply side, wherein the value of the tripping current is set by a voltage value of the actuation voltage;

limiting the actuation voltage to a minimum value, when the forward voltage falls below the setpoint value; and limiting the actuation voltage to a maximum value, when the forward voltage reaches or exceeds the setpoint value.

9. A power distribution apparatus comprising:

a DC voltage supply, a plurality of loads connected to the DC voltage supply by way of serially connected cascaded hierarchy stages connected between the DC voltage supply and the plurality of loads and forming a current path, wherein the current path formed by the hierarchy stages is configured as a radial network that branches with each additional hierarchy stage into a number of parallel sub-paths such that the number of parallel sub-paths of each hierarchy stage closest to a load side corresponds to a number of connected loads, a circuit breaker connected in each sub-path with a respective load and constructed to switch an electrical current conducted in each sub-path, with each circuit breaker having an actuation voltage set based on an actual current conducted by the circuit breaker and the hierarchy stage, and a controller connected to the circuit breakers and configured to successively increase a value of a tripping current of the circuit breakers in each hierarchy stage from the load side toward a supply side, wherein the value of the tripping current is set by a voltage value of the actuation voltage.

10. A power distribution apparatus comprising:

a DC voltage supply, a plurality of loads connected to the DC voltage supply by way of serially connected cascaded hierarchy stages connected between the DC voltage supply and the plurality of loads and forming a current path, wherein the current path formed by the hierarchy stages is configured as a radial network that branches with each additional hierarchy stage into a number of parallel sub-paths such that the number of parallel sub-paths of each hierarchy stage closest to a load side corresponds to a number of connected loads, a circuit breaker connected in each sub-path with a respective load and constructed to switch an electrical current conducted in each sub-path, with each circuit breaker having an actuation voltage set based on setpoint value for a forward voltage the circuit breaker and the hierarchy stage, and a controller connected to the circuit breakers and configured to successively increase a value of a tripping current of the circuit breakers in each hierarchy stage from the load side toward a supply side, wherein the value of the tripping current is set by a voltage value of the actuation voltage.

* * * * *